(Model.) 2 Sheets—Sheet 1.
F. J. SAGER.
SURVEYOR'S STEEL CHAIN TAPE AND REEL.
No. 279,190. Patented June 12, 1883.
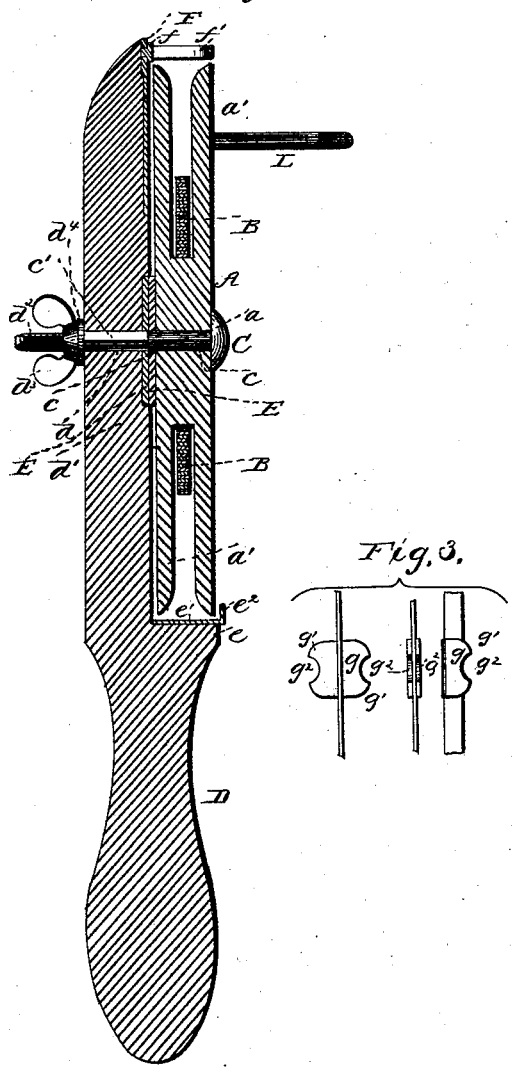
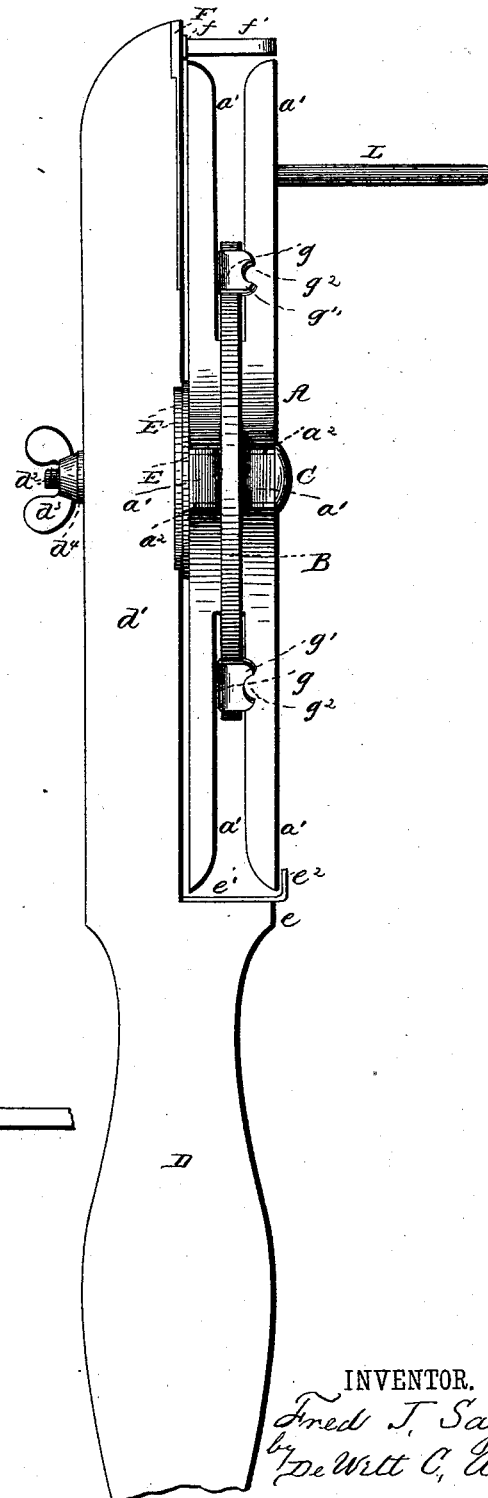
WITNESSES:
Fred. G. Dieterich
Jno. W. Stockett
INVENTOR.
Fred J. Sager.
by DeWitt C. Allen,
ATTORNEY.

(Model.) 2 Sheets—Sheet 2.

F. J. SAGER.
SURVEYOR'S STEEL CHAIN TAPE AND REEL.

No. 279,190. Patented June 12, 1883.

WITNESSES:
Fred. G. Dieterich.
Jno. H. Stockett.

INVENTOR,
Fred J. Sager
by DeWitt C. Allen
ATTORNEY.

UNITED STATES PATENT OFFICE.

FRED J. SAGER, OF MARYSVILLE, OHIO.

SURVEYOR'S STEEL CHAIN-TAPE AND REEL.

SPECIFICATION forming part of Letters Patent No. 279,190, dated June 12, 1883.

Application filed October 10, 1882. (Model.)

*To all whom it may concern:*

Be it known that I, FRED J. SAGER, a citizen of the United States, residing at Marysville, in the county of Union and State of Ohio, have invented certain new and useful Improvements in Surveyor's and Engineer's Steel Chain-Tape and Reel; and I do hereby declare the following to be a full, clear, and exact description of the invention, such as will enable others skilled in the art to which it appertains to make and use the same.

This invention relates to certain new and useful improvements in surveyor's and engineer's steel chain-tape and reel, by which said chain-tape may be paid out and taken up; and the invention consists in novel features of construction, and combination and arrangement of parts, all as will be hereinafter fully described, and set forth in the claims hereto annexed.

Figure 5:
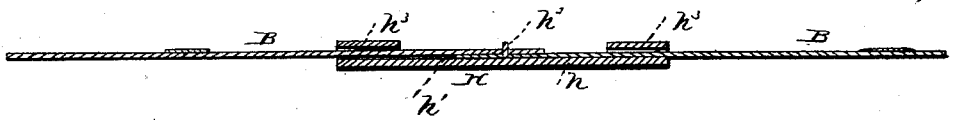
Figure 6:
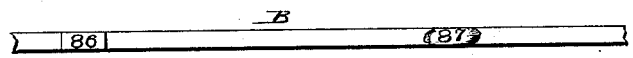
Figure 7:
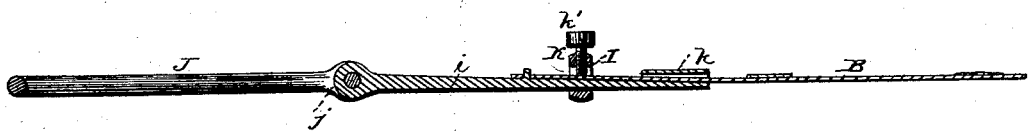
Figure 8:
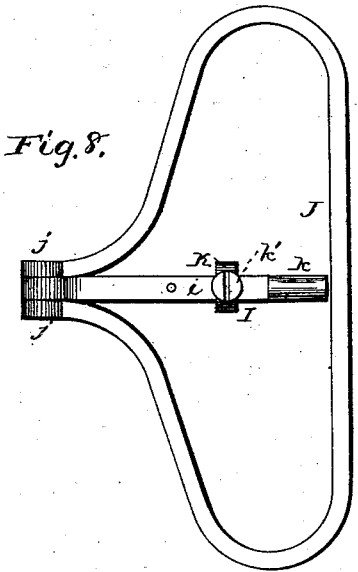

Referring to the accompanying drawings, Figure 1 is a side elevation of my improved reel; Fig. 2, a central vertical section; Fig. 3, a detail view of the guards on tape for setting the pins; Fig. 4, a detail view, showing methods of marking tape; Fig. 5, a longitudinal section of coupling device; Fig. 6, a similar view to Fig. 4; Fig. 7, a longitudinal section of clip attachment; Fig. 8, a plan view of same when folded.

In the drawings, A represents a reel composed of a central hub, $a$, having a series of radial bifurcated arms, $a'$, for the reception of the chain-tape B. This reel is loosely mounted, and revolves on a circular portion, $c$, of the shank of a headed bolt, C, which has also a square portion, $c'$, passing through a corresponding hole, $d$, in the arm $d'$ of the handle D, and a threaded end, $d^2$, for receiving the thumb-nut $d^3$, and washer $d^4$ interposed between said nut and the arm of the handle.

Secured to the inner faces of the reel and arm of the handle are large circular metallic plates E E, which, in connection with the headed screw-bolt and thumb-nut, form a friction-brake for said reel by merely tightening up or loosening said thumb-nut, by which the plates E E are drawn toward or moved from each other.

Secured to the shoulder $e$ of the handle D (formed by cutting away a portion or one-half of the arm $d'$, so that the reel may be on the same plane with reference to the handle) is a metallic plate, $e'$, having a right-angled portion, $e^2$, adapted to project over the outer ends of the reel-arms as the reel is revolved, for forming a guide to prevent the chain-tape from being thrown out of the reel-arms.

On the outer end and inner face of the arm $d'$ is secured a metallic plate, F, through which passes and is secured the shank $f$ of a metallic guide-loop, $f'$, for directing and guiding the chain-tape in taking up or paying it out.

The sides of the reel-arms and hub are lined with metallic strengthening-plates $a^2$.

B represents the chain-tape, formed of a flat and thin elastic metallic band, which is marked into divisions by solder, (see figures 86,) or brass plates secured thereto, (see figures 87,) as shown in Figs. 4 and 6 of the drawings.

$g$ represents metallic clasps secured on the chain-tape at suitable intervals, with their extended ends $g'$ provided with recesses $g^2$, which form guards for setting the marking-pins usually employed in surveying. (See Fig. 3.)

H represents a coupling for joining two lines of chain-tape together, and which is composed of a metallic plate, $h$, having a recessed central portion, $h'$, provided with a stud, $h^2$, and horizontally-slotted end portions, $h^3$ $h^3$, through which the perforated ends of the two lines pass and overlap each other, with the stud $h^2$ passing through them, and thereby securing them together, all as clearly shown in Fig. 5.

I represents a safety-clip attachment, to be used in case of accidental breakage of the chain-tape when on the field, and which is composed of a metallic bar, $i$, pivoted at one end between the ends $j$ of a looped handle, J, and provided at its other end with a horizontal slot, $k$, through which the broken end may be passed and secured by a clip, K, having a set-screw, $k'$, passing over the bar $i$ and end of chain-tape, all as clearly shown in Fig. 7. When said attachment is not in use, the bar $i$ can be turned over within the looped handle, thus making it a convenient article to be carried in the pocket, as shown in Fig. 8.

One of the bifurcated arms of the reel is provided with a handle L, by which the reel may be turned in paying out or taking up the chain-tape.

The figures on the solder or brass plates are put on by steel dies. The method of putting said figures on the tape is very simple and less expensive over all methods heretofore employed for attaching figures to steel tape.

The adjustable folding handle, with its clip attachment, is also used to attach to the end of tape for the purpose of handling, using, or carrying the tape when in use on the field.

Having thus fully described my invention, what I claim as new, and desire to secure by Letters Patent, is—

1. The herein-described coupling for connecting two lines of chain-tape, composed of the bar $h$, having a recessed central portion, $h'$, provided with a stud, $h^2$, and horizontally-slotted ends $h^3 h^3$, substantially as specified.

2. The chain-tape B, provided with metallic clasps $g$, having extended recessed ends $g' g^2$, forming guides for setting marking-pins, substantially as specified.

3. The herein-described reel for chain-tape, consisting of the handle D, provided with arm $d'$, the hub $a$, having bifurcated radial arms $a'$, and a headed bolt having circular, square, and threaded portions $c\ c'\ d^2$, passing through the hub $a$ and arm $d'$, and means for securing them in position, substantially as specified.

4. The reel A and arm $d'$, having circular metallic plates on their inner faces, in combination with the headed bolt C, having circular, square, and threaded portions passing through said parts and the nut and washer $d^3\ d^4$, substantially as and for the purpose herein shown and described.

5. The combination, with the reel having radial bifurcated arms, of the arm $d'$, provided with the guide-loop $f'$, substantially as and for the purpose herein shown and described.

6. The combination, with the reel having bifurcated radial arms, of the handle and arm and right-angled guide-plate $e'\ e^2$, substantially as and for the purpose herein shown and described.

7. The combination, with the reel having radial bifurcated arms, of the handle D and arm $d'$, provided with the guide-plate $e'\ e^2$ and guide-loop $f'$, substantially as herein shown and described.

In testimony whereof I affix my signature in presence of two witnesses.

FRED J. SAGER.

Witnesses:
JAS. W. FIELD,
LEONIDAS PIPER.